May 26, 1970   W. A. CHAMBERS   3,513,502
QUICK CHANGE HOLDER FOR A BLOW NEEDLE
Filed Dec. 4, 1967
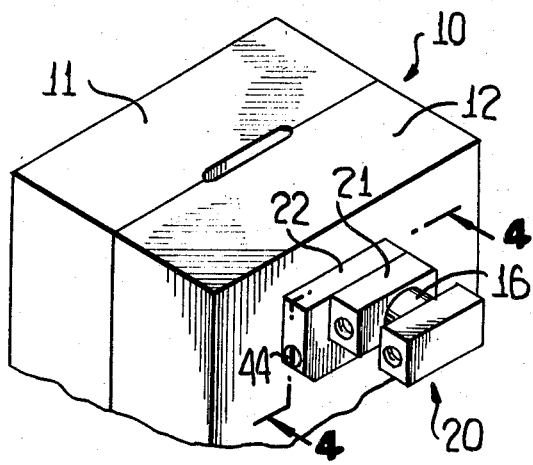
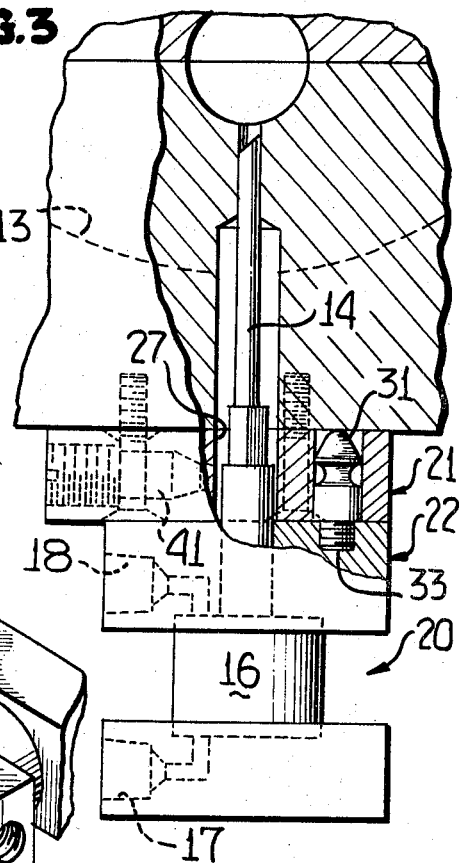
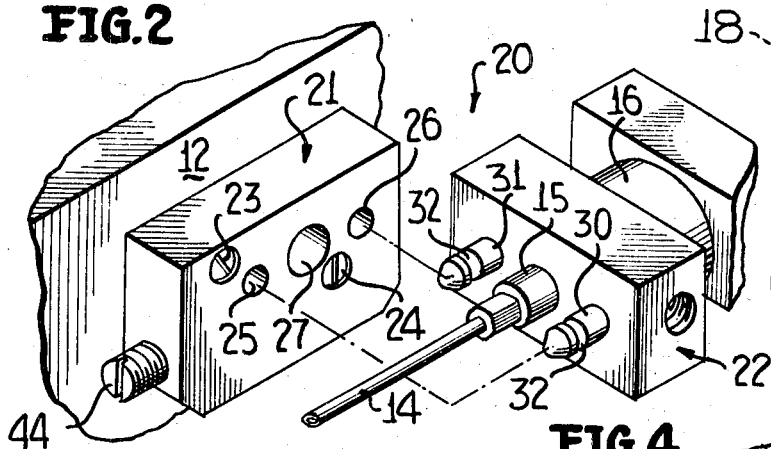
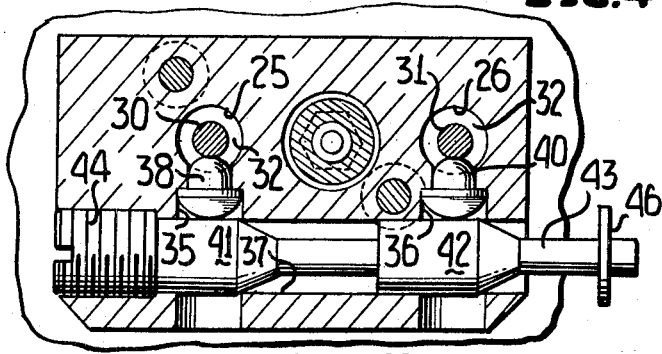
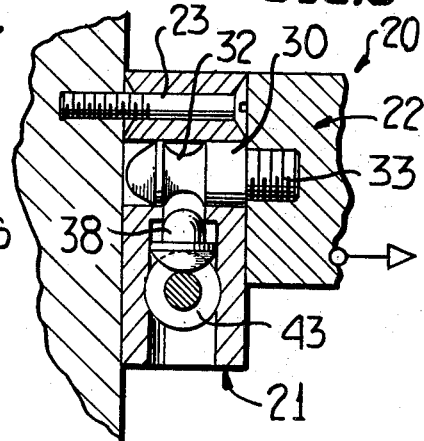
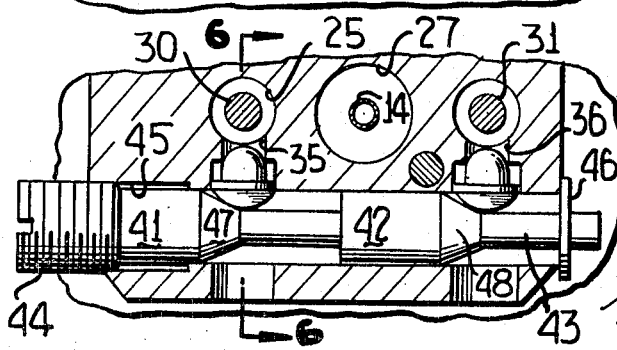
INVENTOR
WILLIAM A. CHAMBERS
BY Mason, Porter, Diller & Brown
ATTORNEYS 3,513,502
QUICK CHANGE HOLDER FOR A BLOW NEEDLE
William Alexander Chambers, Harvey, Ill., assignor to
Continental Can Company, Inc., New York, N.Y., a
corporation of New York
Filed Dec. 4, 1967, Ser. No. 687,769
Int. Cl. B29c 17/07; B29d 23/03
U.S. Cl. 18—5                                    16 Claims

ABSTRACT OF THE DISCLOSURE

This disclosure is directed to a quick change holder for a blow needle cylinder of a blow molding machine, and includes a first member secured to a mold body of a split mold and a second member carrying a blow needle and holder. A quick-detachable coupling releasably secures the members to each other. The coupling includes a relieved male element carried by one member received in a recess of the other member and retained therein by a detent engaging the relieved male element. The detent is maintained in its engaged position by a locking member which includes cam means for moving the detent to its engaged position.

---

Conventional molding machines include a plurality of split molds which rotate about a common axis in a ferris wheel fashion. Each split mold generally includes a pair of mold bodies which when closed define a cavity contoured to the general configuration of an article which is to be molded therein. One of the mold halves is provided with a bore in which is reciprocally mounted a blow needle for puncturing and pneumatically expanding a clamped-off portion of an extruded parison.

If it becomes necessary to remove the blow needle because of it being worn or broken, the mold half carrying the blow needle and its associated cylinder must be removed from its mounting upon the blow molding machine to provide access to a plurality of screws which fasten the cylinder and blow needle to the mold half. After the blow needle is replaced it is then, of course, necessary to remount the blow needle cylinder upon the mold half and replace the mold half in its mounting. The time required to so conventionally replace blow needles is therefore unnecessarily time consuming and results in costly machine down-time.

In keeping with the foregoing, it is a primary object of this invention to avoid the disadvantages of conventional blow needle mounting means by providing a novel quick-change coupling which permits a blow needle and cylinder to be removed from the molding machine without removing the split mold, and also allows the rapid recoupling of the replaced blow needle and its cylinder to the split mold.

A further object of this invention is to provide a novel mechanism of the type aforesaid wherein a first member is secured to a mold body of a split mold, a blow needle and cylinder are carried by a second member, and quick-detachable coupling means are provided by interengageable elements of both members for releasably securing the members to each other whereby the second member and the blow needle carried thereby can be quickly removed from and/or reapplied to the mold body.

A further object of this invention is to provide a novel mechanism of the type heretofore set forth wherein the coupling means is defined by a male element having a relieved end portion carried by one of the members received in a bore of the other of the members and retained in assembled relationship by a movable detent normally engaging the relieved portion of the male element.

Still another object of this invention is to provide a novel mechanism of the type described wherein cam means are provided for moving the detent to its position of engagement with the relieved portion of the male element, and means are further provided for locking the detent in its position of engagement to prevent the members from accidentally uncoupling.

With the above and other objects in view that will hereinafter appear, the nature of the invention will be more clearly understood by reference to the following detailed description, the appended claims and the several views illustrated in the accompanying drawing.

In the drawing:

FIG. 1 is a fragmentary top perspective view of a split mold, and illustrates a mechanism for releasably securing a blow needle and its cylinder to one of the mold bodies of the split mold.

FIG. 2 is a fragmentary top perspective view of the mechanism of FIG. 1 after the blow needle and cylinder have been removed from the mold body, and illustrates a pair of bores formed in the member secured to mold body which receive male elements of the other member which also carries the blow needle and its cylinder.

FIG. 3 is a fragmentary top view partially in section of the mechanism of FIG. 1, and illustrates the position of one of the detents in its associated bore.

FIG. 4 is an enlarged fragmentary sectional view taken generally along lines 4—4 of FIG. 1, and illustrates a pair of detents received in a groove of the male elements for retaining the members in coupled relationship and a locking member for the detents.

FIG. 5 is a fragmentary sectional view similar to FIG. 4, and illustrates the locking member in an unlocked position for releasing the detents to permit the removal of the blow needle carrying member from the mold body.

FIG. 6 is a fragmentary sectional view taken generally along lines 6—6 of FIG. 5, and illustrates one of the detents in its released position.

A split mold 10 (FIG. 1) is formed by a pair of mold halves or bodies 11, 12 which together define a cavity 13 (FIG. 3) in which is adapted to be blow molded a tubular article such as, for example, a bottle, a jug or similar containers. The mold bodies 11, 12 are suitably mounted upon a conventional blow molding machine (not shown) which extrudes a parison between the mold bodies when the latter are in an open position (not shown). The mold bodies 11, 12 are closed in a conventional manner to pinch-off or clamp-off a portion of the extruded tubular plastic material which is eventually punctured by a blow needle 14 and inflated in a known manner to the configuration of the cavity 13.

The blow needle 14 is removably secured to a rod 15 of a piston (not shown) reciprocally mounted within a cylinder 16. Upon the introduction of air into the cylinder 16 through a passage 17 the piston, rod 15 and blow needle 14 are reciprocated forwardly as viewed in FIG. 3 to puncture the pinched-off portion of the parison and blow the same to the configuration of the cavity 13, as was heretofore noted. The introduction of air into the cylinder 16 through a passage 18 retracts the piston, the rod 15 and the blow needle 14 to the position shown in FIG. 3 and cuts-off the flow of air through the blow needle 14 in a known manner.

It is at times desirable and necessary to remove the blow needle 14 from the mold body 12 as, for example, when the blow needle 14 becomes worn or broken. During the blow molding of containers from polyvinyl chloride a greasy residue from the exhaust vapors builds up on the blow needles and frequent changes of the needles in the absence of excessive machine down-time is desirable. In keeping with this invention a novel mechanism 20 is provided for quickly removing the blow needle 14 and its cylinder 16 from the mold body 12, and quickly reapplying the cylinder and blow needle to its operative position (FIG. 3) after the blow needle 14 has been inspected, replaced, etc.

The mechanism 20 includes a pair of coupling members 21, 22 constructed from metallic material.

The coupling member 21 is a generally rectangular body which is secured to the mold body 12 by a pair of screws 23, 24. Cylindrical recess means or bores 25, 26 are formed in the member 21 to either side of a larger bore 27 through which is adapted to pass the blow needle 14 and the rod 15 in the manner best illustrated in FIG. 3 of the drawing. The bores 25, 26 are of a diameter to snugly slidingly receive a pair of male coupling elements 30, 31 having terminal ends provided with circumferential grooves or similar equivalent relieved means 32. The male elements 30, 31 are carried by the coupling member 22 and may be, for example, secured thereto by threaded end portions 33 (FIG. 3) received in threaded bores (unnumbered) of the coupling member 22.

The coupling member 21 is also provided with a pair of bores 35, 36 (FIGS. 4 and 5) which open into the respective bores 25, 26 and into a bore 37. The bores 35, 36 house respective retaining means or detents 38, 40 which in the locked or uppermost position thereof as viewed in FIG. 4 are received in the grooves 32 of the respective male elements 30, 31. The detents 38, 40 and the grooves 32 of the male elements 30, 31 thereby define readily detachable coupling means which releasably secure the members 21, 22 to each other when positioned as shown in FIG. 4.

The elements 30, 31 and the detents 38, 40 are maintained in coupled relationship by respective locking means 41, 42 which are cylindrical portions of a member 43 mounted for movement in the bore 37. A threaded end portion 44 of the member 43 is received in a threaded counterbore 45, and is accessible exteriorly of the member 21 for moving the member 43 between the locked position shown in FIG. 4 and the unlocked position shown in FIG. 5. For example, assuming the detents 38, 40 are held in the clamped position thereof shown in FIG. 4 and it is desired to remove the coupling member 22, the cylinder 16, and the associated blow needle 14 from the mold body 12, a screw driver or similar tool is used to unthread the end portion 44 from the position shown in FIG. 4 to the position shown in FIG. 5. In the latter-noted position a stop 46 prevents the member 43 from being completely removed from the bore 37. During the unthreading of the member 43 and its movement to the left the detents 38, 40 drop by gravity to the position illustrated in FIG. 5 at which point the member 22 can be removed as shown in FIG. 4 because of the uncoupling between the detents 38, 40 and the grooves 32 of the male elements 30, 31.

After the blow needle 14 has been cleaned, replaced, etc., the coupling member 22 is positioned relative to the coupling member 21 as shown in FIG. 3 with the male elements 30, 31 received in the respective bores 25, 26. The member 43 is then threaded into the bore 37 whereupon cam means 47, 48 adjacent the respective locking means 41, 42 progressively urge the detents 38, 40 respectively, upwardly to the clamped position illustrated in FIG. 4. Thus, the mechanism 20 permits the blow needle 14, the rod and the cylinder 16 to be quickly removed from and re-applied to the mold body 12 of the split mold 10 without in any way removing the mold body 12 from its mountings relative to the blow molding machine. It should also be appreciated from the foregoing description that the speed at which the coupling and uncoupling can be achieved is rapid since it requires the threading and/or unthreading of but the single member 43.

From the foregoing, it will be seen that novel and advantageous provisions have been made for carrying out the desired end. However, attention is again directed to the fact that additional variations may be made in this invention without departing from the spirit and scope thereof as defined in the appended claims.

I claim:

1. In a molding machine of the type including a split mold carrying a blow needle for puncturing and expanding a clamped-off portion of tubular plastic material, the improvement comprising a first member secured to a mold body of said split mold and a second member carrying said blow needle, and quick-detachable coupling means for releasably securing said members to each other whereby said second member and the blow needle carried thereby can be quickly removed from said mold body.

2. In a molding machine as defined in claim 1 including releasable locking means for releasably locking said coupling means in the coupled condition thereof.

3. In a molding machine as defined in claim 1 wherein one of said members includes recess means, the other of said members includes means for entering said recess means, and said coupling means is defined in part by an element which normally retains said entering means releasably coupled within said recess means.

4. In a molding machine as defined in claim 1 wherein said first member and said mold body have aligned bores, and said blow needle is telescopically received within said bores in the coupled condition of said coupling means.

5. In a molding machine as defined in claim 1 including cam means for placing said coupling means in the coupled condition thereof.

6. In a molding machine as defined in claim 2 wherein said locking means carries cam means for placing said coupling means in the coupled condition thereof.

7. In a molding machine as defined in claim 3 wherein said entering means includes a relieved portion, and said retaining element is a detent movable into and out of engagement with said relieved portion.

8. In a molding machine as defined in claim 3 including releasable locking means for releasably locking said retaining element in a position retaining said entering means releasably coupled within said recess means.

9. In a molding machine as defined in claim 3 including cam means for moving said retaining element to a position retaining said entering means releasably coupled within said recess means.

10. In a molding machine as defined in claim 3 including releasable locking means for releasably locking said retaining element in a position retaining said entering means releasably coupled within said recess means, and cam means for moving said retaining element to a position retaining said entering means releasably coupled within said recess means.

11. In a molding machine as defined in claim 7 including releasable locking means for releasably locking said detent in engagement with said relieved portion.

12. In a molding machine as defined in claim 7 including releasable locking means for releasably locking said detent in engagement with said relieved portion, and said locking means is a member movable in a direction generally normal to the axis of said detent.

13. In a molding machine as defined in claim 7 including cam means for moving said retaining element to a position retaining said entering means releasably coupled within said recess means, and said cam means is carried by a member movable in a direction generally normal to the axis of said retaining element.

14. In a molding machine as defined in claim 7 wherein said entering means is a male coupling element having a relieved terminal end portion, said retaining element is a detent movable into and out of engagement with said relieved portion, said retaining element is movable in a bore opening into said recess means, and releasable locking means are provided for contacting said detent and maintainig the same in engagement with said relieved portion.

15. In a molding machine as defined in claim 14 wherein said locking means is a member movably housed in a bore disposed transversely to said first-mentioned bore.

16. In a molding machine as defined in claim 15 wherein said locking member includes cam means for moving said detent into engagement with said relieved portion.

References Cited
UNITED STATES PATENTS

| | | | |
|---|---|---|---|
| 2,515,093 | 7/1950 | Mills | 18—5 |
| 2,750,625 | 6/1956 | Colombo | 18—5 |
| 3,097,398 | 7/1963 | Inglesby | 18—5 X |
| 3,338,998 | 8/1967 | Settembrini | 18—5 X |

WILBUR L. McBAY, Primary Examiner

U.S. Cl. X.R.

18—35